United States Patent
Huh et al.

(10) Patent No.: US 9,413,432 B2
(45) Date of Patent: Aug. 9, 2016

(54) NEAR FIELD WIRELESS TRANSMISSION/RECEPTION METHOD AND APPARATUS

(71) Applicants: Samsung Electronics Co., Ltd., Gyeonggi-do (KR); Korea Advanced Institute of Science and Technology, Daejeon (KR)

(72) Inventors: Jae-Young Huh, Seoul (KR); Hoi-Jun Yoo, Daejeon (KR); Dong-Churl Kim, Gyeonggi-do (KR); Kyu-Sub Kwak, Seoul (KR); Jea-Hyuck Lee, Gyeonggi-do (KR); Hyun-Woo Cho, Gyeonggi-do (KR); Tae-Hwan Roh, Gyeonggi-do (KR); Un-Soo Ha, Gyeongsangnam-do (KR)

(73) Assignees: Samsung Electronics Co., Ltd (KR); Korea Advanced Institute of Science and Technology (KR)

(*) Notice: Subject to any disclaimer, the term of this patent is extended or adjusted under 35 U.S.C. 154(b) by 4 days.

(21) Appl. No.: 13/968,909

(22) Filed: Aug. 16, 2013

(65) Prior Publication Data

US 2014/0086345 A1  Mar. 27, 2014

(30) Foreign Application Priority Data

Sep. 24, 2012  (KR) .................. 10-2012-0105698

(51) Int. Cl.
  *H04B 5/02*  (2006.01)
  *H04B 5/00*  (2006.01)

(52) U.S. Cl.
  CPC ............ *H04B 5/0075* (2013.01); *H04B 5/0031* (2013.01); *H04B 5/02* (2013.01); *Y02B 60/50* (2013.01)

(58) Field of Classification Search
  CPC ...... H05B 5/0075; H05B 5/02; H05B 5/0031; G06K 7/0008
  USPC ........................................ 375/256
  See application file for complete search history.

(56) References Cited

U.S. PATENT DOCUMENTS

| 4,715,047 A | * | 12/1987 | Hambley | ............ H04L 27/2332 329/310 |
| 4,992,754 A | * | 2/1991 | Blauvelt et al. | ................ 330/149 |

(Continued)

FOREIGN PATENT DOCUMENTS

| EP | 2234279 | * | 9/2010 | ................ H04B 1/07 |
| EP | 2234279 A1 | * | 9/2010 | ................ H04B 1/69 |
| FI | EP 2234279 A1 | * | 9/2010 | .......... G06K 7/10306 |

OTHER PUBLICATIONS

Miura, Noriyuki et al. "A 0.14pJ/b Inductive-Coupling Inter-Chip Data Transceiver with Digitally-Controlled Precise Pulse Shaping," IEEE 2006, ISSC Conference.*

(Continued)

*Primary Examiner* — Daniel Washburn
*Assistant Examiner* — Berhanu Tadese
(74) *Attorney, Agent, or Firm* — The Farrell Law Firm, P.C.

(57) ABSTRACT

Provided is a near field wireless communication apparatus that uses magnetic coupling and a method for operation of the apparatus, in which the magnetic coupling is used to transmit data or clock information with low power and high efficiency. A pulse generator of the near field wireless communication apparatus generates a pulse signal corresponding to transmission digital data to be transmitted. When the transmission digital data is "1," the near field wireless communication apparatus modulates the data into the pulse signal and transmits the pulse signal. When the data is "0," the near field wireless communication apparatus does not output the pulse.

10 Claims, 8 Drawing Sheets

(56) References Cited

U.S. PATENT DOCUMENTS

| | | | | |
|---|---|---|---|---|
| 5,808,770 | A * | 9/1998 | Chen | H04B 10/516 372/25 |
| 8,005,119 | B2 * | 8/2011 | Kuroda | H04J 3/047 370/503 |
| 8,373,544 | B2 * | 2/2013 | Pitt-Pladdy | G06K 7/0008 340/10.1 |
| 2007/0236270 | A1 * | 10/2007 | Chiang | G06F 1/04 327/291 |
| 2007/0289772 | A1 * | 12/2007 | Kuroda | H01L 25/0657 174/260 |
| 2008/0031379 | A1 * | 2/2008 | Feldtkeller | H04B 5/00 375/295 |
| 2008/0311862 | A1 * | 12/2008 | Spina | H01Q 1/38 455/78 |
| 2009/0075591 | A1 * | 3/2009 | Murdoch | G06K 19/0723 455/41.1 |
| 2009/0137219 | A1 * | 5/2009 | Williams | 455/214 |
| 2009/0196312 | A1 | 8/2009 | Kuroda | |
| 2009/0267848 | A1 | 10/2009 | Kuroda | |
| 2010/0329364 | A1 * | 12/2010 | Giombanco | H04B 1/16 375/258 |
| 2011/0102015 | A1 | 5/2011 | Kuroda | |
| 2011/0156488 | A1 * | 6/2011 | Kuroda | H01L 23/48 307/104 |
| 2011/0201271 | A1 | 8/2011 | Kuroda | |
| 2011/0243277 | A1 * | 10/2011 | Noel | 375/334 |
| 2011/0255352 | A1 | 10/2011 | Kuroda | |
| 2011/0260786 | A1 | 10/2011 | Kuroda | |
| 2011/0300798 | A1 * | 12/2011 | Lefley | H02J 17/00 455/41.1 |
| 2011/0300799 | A1 * | 12/2011 | Da Fonseca | H04B 5/0075 455/41.1 |
| 2012/0007438 | A1 | 1/2012 | Kuroda | |

OTHER PUBLICATIONS

Bi-phase modulation (Binary Phase-shift keying) by Sweetwater Apr. 21, 2006—Internet Citation.*

Jantunen, J. et al., "A New Symmetric Transceiver Architecture for Pulsed Short-Range Communication," Global Telecommunications Conference, 2008. IEEE Globecom 2008. IEEE, vol., No., pp. 1, 5.*

Miura, N. et al., "A 1Tb/s 3W inductive-coupling transceiver for inter-chip clock and data link," ISSCC—IEEE 2006.*

Miura et al., "A 1Tb/s 3W inductive-coupling transceiver for inter-chip clock and data link," ISSCC—IEEE 2006.*

Miura, Noriyuki et al., A 1Tb/s 3W Inductive-Coupling Transceiver for Inter-Chip Clock . . . , 2006 IEEE International Solid-State Circuits Conference, Copyright 2006 IEEE, pp. 10.

Miura, Noriyuki et al., An 11Gb/s Inductive-Coupling Link with Burst Transmission, 2008 IEEE International Solid-State Circuits Conference, Copyright 2008 IEEE, pp. 3.

Miura, Noriyuki et al., A 2.7Gb/s/mm$^2$ 0.9pJ/b/Chip 1Coil/Channel ThruChip Interface . . . , 2011 IEEE International Solid State Circuits Conference, Copyright 2011 IEEE, pp. 3.

Take, Yasuhiro et al., A 30Gb/s/link 2.2Tb/s/mm$^2$ Inductively-Coupled Injection-Locking CDR, IEEE Asian Solid-State Circuits Conference, Copyright 2010 IEEE, pp. 4.

* cited by examiner

NEAR FIELD WIRELESS TRANSMISSION/RECEPTION METHOD AND APPARATUS

PRIORITY

This application claims priority under 35 U.S.C. §119(a to Korean Application Serial No. 10-2012-0105698, which was filed in the Korean Intellectual Property Office on Sep. 24, 2012, the entire content of which is incorporated herein by reference.

BACKGROUND OF THE INVENTION

1. Field of the Invention

The present invention generally relates to a near field wireless communication apparatus, and more particularly, to a near field wireless transmission/reception method and apparatus using magnetic coupling.

2. Description of the Related Art

A near field wireless communication apparatus using magnetic coupling or near field magnetic induction transmits/receives data or a clock signal using various methods. For example, data transmission/reception methods include a pulse base method and a baseband method. Also, clock signal transmission methods include a simple amplification configuration transmission/reception method, a mutual injection-locking CLK (CLocK) method, and an injection-locking CDR (Clock-and-Data Recovery) method. The principles of these methods are illustrated in FIGS. 1 to 6.

FIG. 1 illustrates an operation principle of a general pulse base data communication apparatus. This method transmits data by modulating the data to a positive pulse when transmission data is "1" and modulating the transmission data to a negative pulse when transmission data is "0". Thus, as illustrated in FIG. 1, the transmitter applies the positive pulse and the negative pulse alternately to a coupler according to the transmission data (Tx output). In such a case, the receiver of the coupler (Rx input) is loaded with a waveform in a form in which a negative pulse comes up directly after a positive pulse or a positive pulse comes up directly after a negative pulse. The receiver amplifies and then samples the waveform to recover the data. However, in this case, the sampling becomes very important.

FIG. 2 illustrates a sampling timing issue in the pulse base method. Referring to FIG. 2, when sampling is not conducted with proper timing, an error occurs in data recovery. Since the timing for normally recovering data is very short, the timing should be adjusted using a sophisticated delay cell. If a temperature change occurs and thus the delay is changed, the timing should be directly adjusted (See, e.g. Paper, N. Miura et al., "*A 1 Tb/s 3W Inductive-Coupling Transceiver for 3-D Stacked Inter-Chip Clock and Data Link*," in IEEE Journal of Solid-State Circuits, vol. 42, NO. 1, January 2007, pp. 111-122).

FIG. 3 illustrates an operation principle of a conventional baseband data communication apparatus. According to this method, a transmitter applies current to a coupler in the same form with transmission data. Since transitions of current do not occur successively in the transmitter, a pulse type waveform is transferred to a receiver. Data may be simply recovered from the pulse type waveform using a hysteresis comparison method. When the data is recovered in this manner, no delay cell is required since clock synchronization is not required. However, since DC current should be continuously applied in order to reduce transitions in the transmitter, power consumption is enormous (See, e.g. Paper, N. Miura et al., "*An 11 Gb/s Inductive-Coupling Link with Burst Transmission*" in IEEE ISSCC Dig. Tech. Papers, February 2008 pp. 297-299).

FIG. 4 illustrates an operation principle of a conventional simple amplification configuration communication apparatus. According to this method, received clock information is simply amplified and recovered. Since the signal to be recovered is a clock signal, it is less necessary to consider linearity in amplification. However, since the speed is very rapid, it is necessary to consume an enormous amount of power in order to obtain a high gain while securing a bandwidth (See, e.g. Paper, N. Miura et al., "*A 1 Tb/s 3W Inductive-Coupling Transceiver for 3-D Stacked Inter-Chip Clock and Data Link*," in IEEE Journal of Solid-State Circuits, vol. 42, NO. 1, January 2007, pp. 111-122).

FIG. 5 illustrates an operation principle of a mutual injection-locking CLK (CLocK) method. This method describes a concept of mutually sharing one VCO (Voltage Controlled Oscillator) rather than a communication apparatus. When VCOs in different chips are tuned to similar frequencies and brought close to each other, coupling occurs between them, thereby generating a mutual injection-locking. Then, since the two VCOs have the same frequency, they may use one clock as if they share the clock. When this is applied, a plurality of chips rather than two chips may share one clock. However, in this method, a frequency mismatch may occur in each chip and it is impossible to accurately estimate the frequency of the finally generated clock. Of course, since an LC element is used, a more accurate estimation is possible than a ring oscillator. However, in order to use this method in a data sampling and a system clock, it is necessary to tune the frequencies very accurately (See, e.g., Paper, N. Miura et al., "*A 2.7 Gb/s/mm$^2$ 0.9 pJ/b/Chip 1 Coil/Channel Thru Chip Interface with Coupled-Resonator-Based CDR for NAND Flash Memory Stacking*," in IEEE ISSCC Dig. Tech. Papers, February 2011, pp. 490-492).

FIG. 6 illustrates an operation principle of an injection-locking CDR (Clock-and-Data Recovery) communication apparatus. This method is an injection-locking method used for recovering data in CDR in which a signal transferred to the input of a receiver is passed through a buffer and then injection-locked, thereby recovering a clock signal. This method conducts locking by performing switching according to a cycle of a pulse rather than causing current to flow by a pulse width (See, e.g., Paper, Y. Take et al., "*A 30 Gb/s/Link 2.2 Tb/s/mm$^2$ Inductive-Coupled Injection-locking CDR for High-speed DRAM Interface*," in IEEE Journal of Solid-State Circuits, vol. 46, NO. 11, November 2011, pp. 2552-2559).

The problems of the above described conventional technologies are as follows.

In the case of the pulse base method, it is very difficult to implement a delay cell. In addition, there is a disadvantage in that whenever a temperature change occurs, adjustments should be performed again. The base band method has a disadvantage in that since DC current is used in order to reduce transitions, power consumption is enormous.

The simple amplification configuration communication apparatus for clock transmission/reception consumes an enormous amount of power in order to obtain a high gain while securing a bandwidth due to a high speed. The mutual injection-locking CLK transmission/reception method has problems in that a frequency mismatch may occur in each chip, and it is impossible to accurately estimate the frequency of the finally generated clock. Strictly speaking, the injection-locking CDR transmission/reception method is not a method of recovering a clock but a method of recovering timing only in view of the fact that as transitions of data increase, locking is conducted well and when the transitions are reduced, a section in which locking is not conducted is increased.

SUMMARY OF THE INVENTION

The present invention has been made to address at least the problems and disadvantages described above, and to provide at least the advantages described below. Accordingly, an aspect of the present invention is to provide a near field wireless transmission/reception method and apparatus which reduces power consumption.

Another aspect of the present invention is to provide a near field wireless transmission/reception method and apparatus which have a low error rate compared with a pulse base method and do not require a sophisticated delay cell.

Still another aspect of the present invention is to provide a near field wireless transmission/reception method and apparatus which may recover clock information successively and enable accurate frequency matching of clock signals.

According to an aspect of the present invention, there is provided a data transmitting/receiving method of a near field wireless communication apparatus using magnetic coupling. The method includes generating, by a pulse generator, a first positive pulse signal corresponding to transmission digital data by outputting a positive pulse when the transmission digital data is "1" and not outputting a pulse when the transmission digital data is "0"; driving a data transmission coupler only for a period in which the first positive pulse signal is the positive pulse, thereby transmitting the transmission digital data; generating a positive/negative pulse signal in which a positive pulse and a negative pulse intersect, in response to signal reception in a data reception coupler; comparing a reference value with the positive/negative pulse signal to change the positive/negative pulse signal to a second positive pulse signal; and demodulating the second positive pulse signal to reception digital data.

According to an aspect of the present invention, there is provided a near field wireless communication apparatus using magnetic coupling. The apparatus includes a data transmission coupler; a pulse generator configured to output a positive pulse when transmission digital data is "1" and to not output a pulse when the transmission digital data is "0," thereby generating a first positive pulse signal corresponding to the transmission digital data; and a driver configured to a data transmission coupler only for a period in which the first positive pulse signal is the positive pulse, thereby transmitting the transmission digital data.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
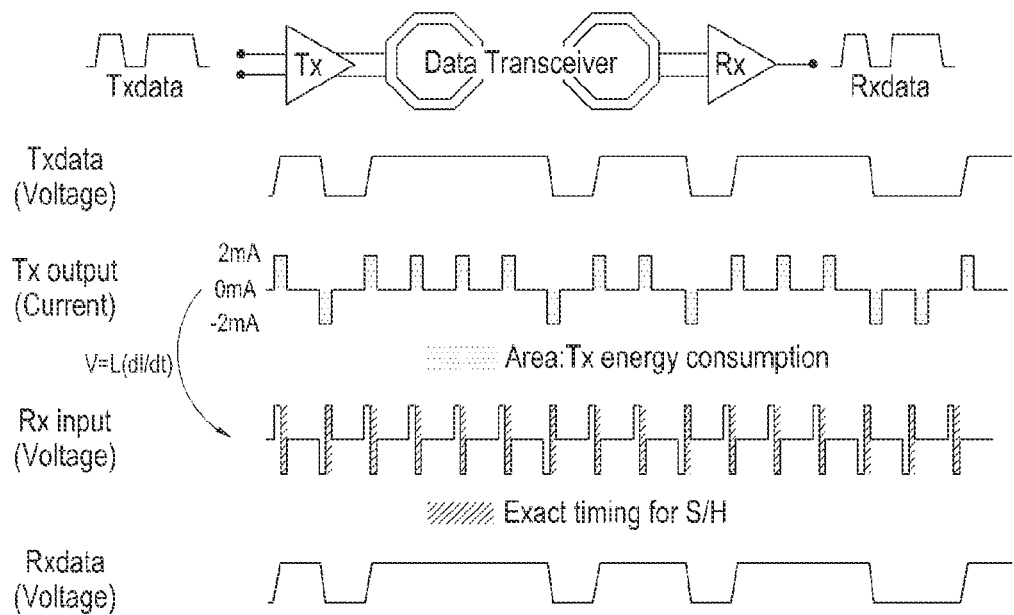
FIG. 1 illustrates an operation principle of a general pulse data communication apparatus.
Figure 2:
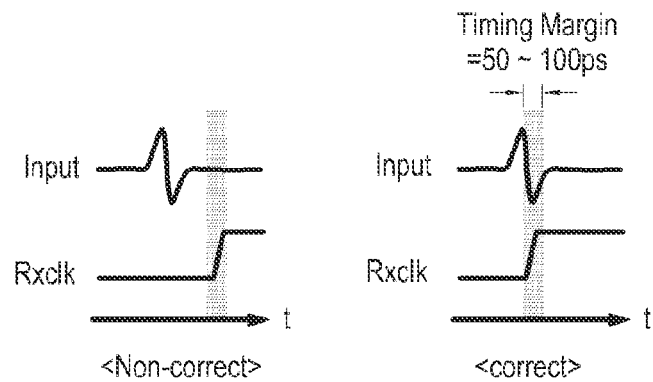
FIG. 2 illustrates a sampling timing issue in a conventional pulse data method.
Figure 3:
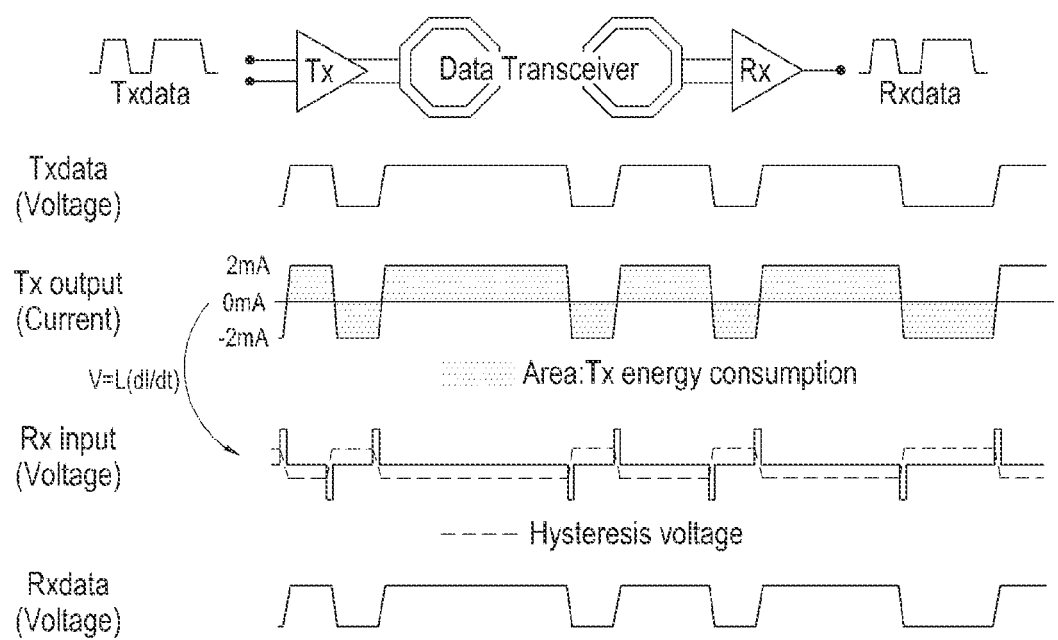
FIG. 3 illustrates an operation principle of a conventional base band data communication apparatus.
Figure 4:
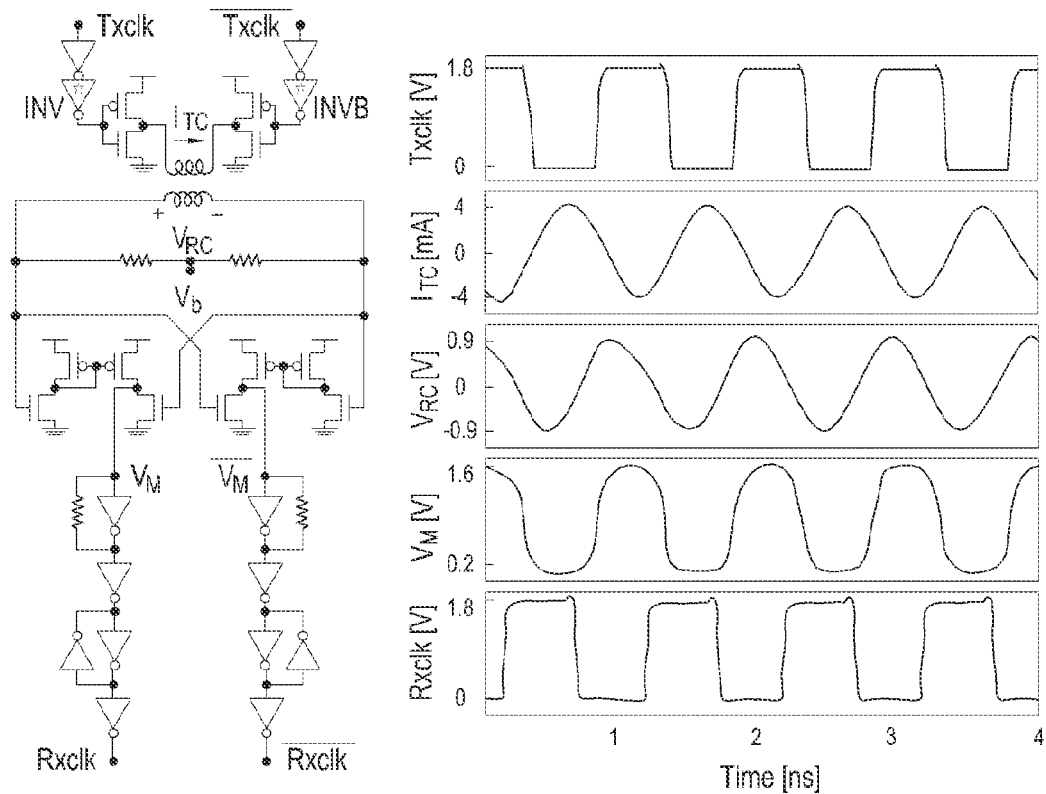
FIG. 4 illustrates an operation principle of a conventional simple amplification configuration clock communication apparatus.
Figure 5:
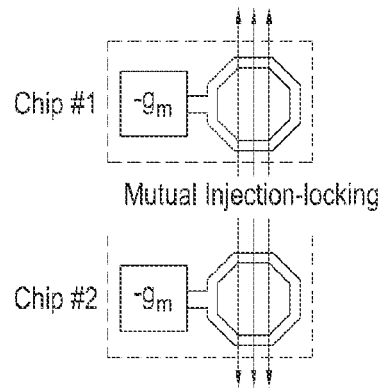
FIG. 5 illustrates an operation principle of a conventional mutual injection-locking clock (CLK) method.
Figure 6:
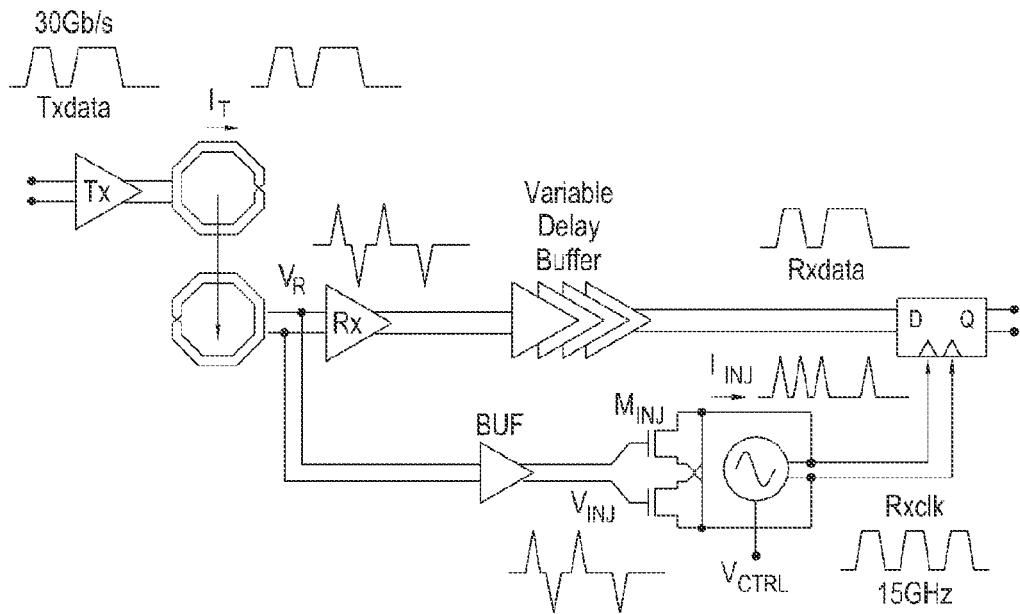
FIG. 6 illustrates an operation principle of a conventional injection-locking clock-and-data recovery (CDR) communication apparatus.

Hereinbelow, embodiments according to the present invention will be described with reference to the accompanying drawings. It shall be noted that the same component illustrated in different drawings will be denoted by the same reference numeral or symbol, if possible. Also, in the following description, a detailed description of known functions and configurations incorporated herein will be omitted when it may make the subject matter of the present invention unclear.

The present invention enables a near field wireless communication apparatus using magnetic coupling to transmit data or clock information with low power and high efficiency. Thus, a near field wireless communication apparatus according to present invention transmits a signal by modulating transmission data when the transmission data is "1," and does not transmit a signal at all when the transmission data is "0." In other words, the near field wireless communication apparatus according to the present invention changes digital data to a positive pulse signal and transmits the digital data by applying pulse current to a transmission coupler only when the positive pulse signal is "1" according to a clock cycle.

In addition, when current is induced in a reception coupler, the near field wireless communication apparatus according to the present invention generates a positive/negative pulse signal in response to the induced current, recovers the positive/negative pulse signal to a positive pulse signal, and then recovers the positive pulse signal to digital data. A demodulator configured to recover the positive pulse signal to the digital data includes a first delay flip-flop configured to toggle and output the second positive pulse signal; a second delay flip-flop configured to sample the output of the first delay flip-flop; a third delay flip-flop configured to delay the output of the second delay flip-flop; and an exclusive OR gate to which the output of the second delay flip-flop and the output of the third delay flip-flop are input.

In addition, the near field wireless communication apparatus may be provided with a dedicated transmission/reception coupler configured to transmit/receive a clock signal. The near field wireless communication apparatus transmits a clock signal through the clock transmission coupler. Therefore, when current is induced in the clock reception coupler, the near field wireless communication apparatus amplifies and then applies the current to the clock generator so that a clock signal harmonized to the received clock signal is generated.

Figure 7:
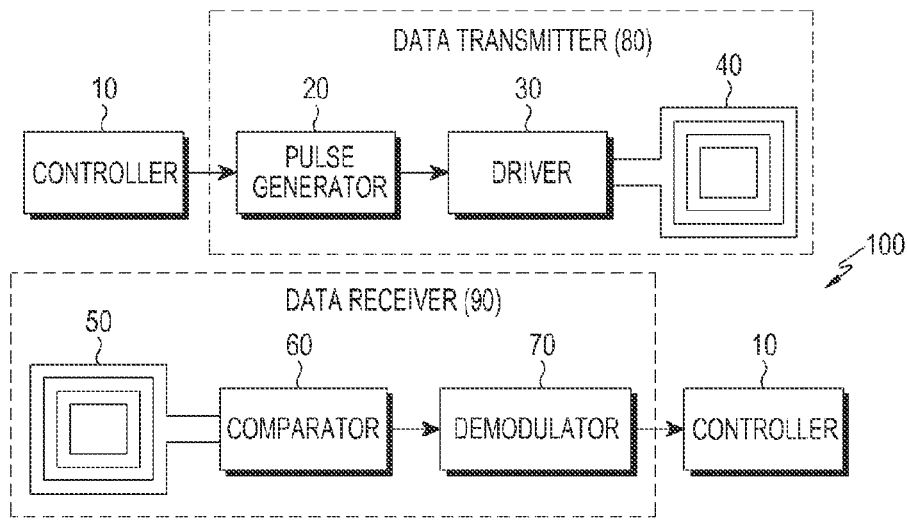
FIG. 7 illustrates a configuration of a near field communication apparatus according to an embodiment of the present invention.

The data transceiver of the near field wireless communication apparatus using magnetic coupling is illustrated in FIG. 7. In FIG. 7, the data transmitter 80 and the data receiver 90 of the near field wireless communication apparatus 100 are separately illustrated in order to help with the understanding of the present invention. However, a single near field wireless communication apparatus 100 includes both the data transmitter 80 and the data receiver 90.

Referring to FIG. 7, the near field wireless communication apparatus 100 includes a controller 10, a data transmitter 80, and a data receiver 90. According to an embodiment of the present invention, the data transmitter 80 includes a pulse generator 20, a driver 30, and data transmission coupler 40. The data receiver 90 includes a data reception coupler 50, a comparator 60, and a demodulator 70.

The controller 10 outputs digital data to the data transmitter 80 according to the transmission clock signal and properly processes digital data input to the data receiver 90.

The pulse generator 20 converts the digital data input from the controller 10 into a positive pulse. In other words, according to the transmission clock signal, the pulse generator 20 outputs a positive signal of which the pulse value is a positive number when the digital data is "1" and generates a positive signal of which the pulse value is "0," and outputs the positive pulse signal to the driver 30.

According to the positive pulse signal applied from the pulse generator 20, the driver 30 applies current to the data transmission coupler 40 when the pulse value is a positive number and does not apply current to the data transmission coupler 40 when the pulse value is "0." Thus, the data is transmitted to a reception side near field wireless communication apparatus.

Whenever current is induced in the data reception coupler 50 as being inductive-coupled to the data transmission coupler 40 of the transmission side near field wireless communication apparatus (in other words, whenever data is received), a positive/negative pulse signal having a waveform in the form in which a positive pulse comes up once, just thereafter a negative pulse comes up and then the negative pulse returns to "0" is generated in the reception coupler 50 and the pulse signal is output to the comparator 60. The positive/negative pulse signal is a form of a signal automatically generated in the data reception coupler 50 by mutual inductance as a pulse signal is applied to the data transmission coupler 40 of the transmission side near field wireless communication apparatus. That is, a positive type waveform is generated by a rising edge portion of the pulse signal and a negative type waveform is generated by a falling edge portion of the pulse.

The comparator 60 compares the reference signal and the positive/negative pulse signal input to the data reception coupler 50. For a value smaller than the reference signal, the comparator 60 outputs "0" and for a value larger than the reference signal, the comparator 60 outputs a specific integer value larger than a reference value, thereby recovering the positive/negative pulse signal in a pulse form. Thus, the comparator 60 recovers a positive pulse signal which is the same form as that sent by the transmission side near field wireless communication apparatus. Then, the comparator 60 outputs the positive pulse signal to the demodulator 70. Here, the reference signal has a value larger than "0" and smaller than the value of the positive pulse of the positive/negative pulse signal.

Figure 8:
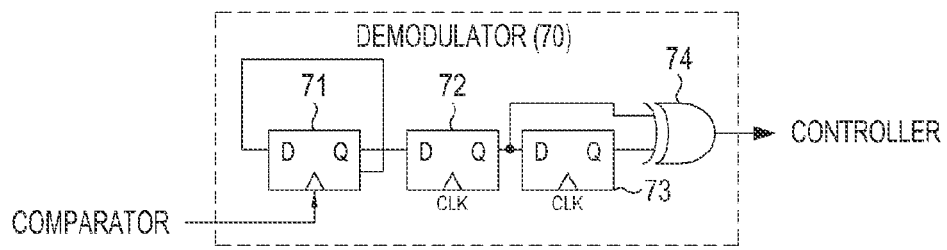
FIG. 8 illustrates a configuration of a demodulator according to an embodiment of the present invention.

The demodulator 70 demodulates the positive pulse signal to digital data according to the reception clock signal and outputs the digital data to the controller 10. According to an embodiment of the present invention, as illustrated in FIG. 8, the demodulator 70 includes a first delay flip-flop 71, a second delay flip-flop 72, a third delay flip-flop 73, and an exclusive OR gate 74.

The first delay flip-flop 71 toggles the positive pulse input from the comparator 60 and outputs the signal to the second delay flip-flop 72.

The second delay flip-flop 72 serves to sample the signal input from the first delay flip-flop 71, and the output signal of the second delay flip-flop 72 is input to the third delay flip-flop 73. In addition, the output signal of the second delay flip-flop 72 is input to the exclusive OR gate 74.

The third delay flip-flop 73 serves to delay the output signal of the second delay flip-flop 72, and the output signal of the third delay flip-flop 73 is input to the exclusive OR gate 74.

Further, the exclusive OR gate 74 conducts an XOR operation for the output signal of the second delay flip-flop 72 and the output signal of the third delay flip-flop 73 and outputs the resultant signal. Thus, the output value becomes the demodulated digital data.

Here, the third delay flip-flop 73 is used so as to cause the output signal of the second delay flip-flop 72 and the output signal of the third delay flip-flop 73 to be correctly matched to one cycle of the clock signal.

Figure 11:
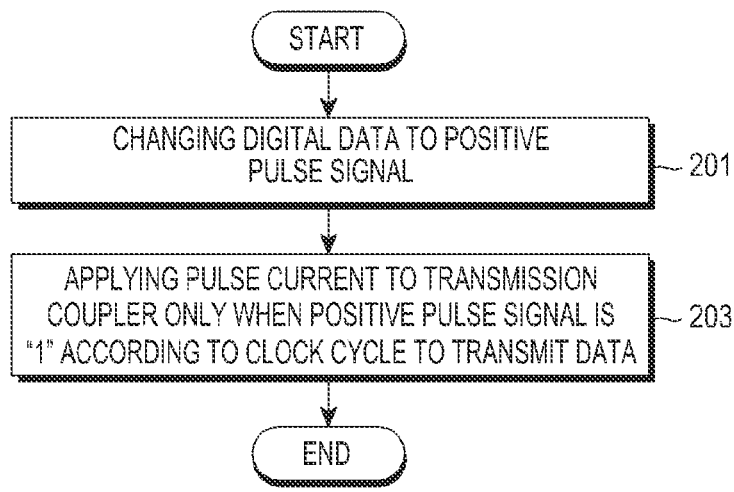
FIGS. 11 to 13 illustrate operation processes of a near field communication apparatus according to an embodiment of the present invention.

A process of transmitting data by the near field wireless communication apparatus 100 is illustrated in FIG. 11. Referring to FIG. 11, the wireless communication apparatus 100 changes digital data to be transmitted to a positive pulse signal in step 201. Then, in step 203, the near field wireless communication apparatus 100 applies pulse current to the transmission coupler only when the positive signal is "1" according to the cycle of the transmission clock so as to transmit the digital data.

Figure 12:
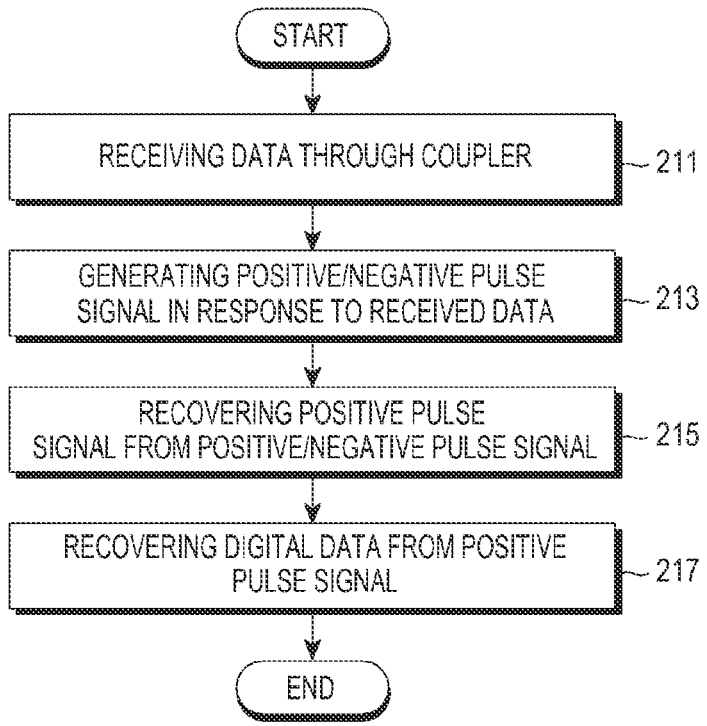
Figure 14:
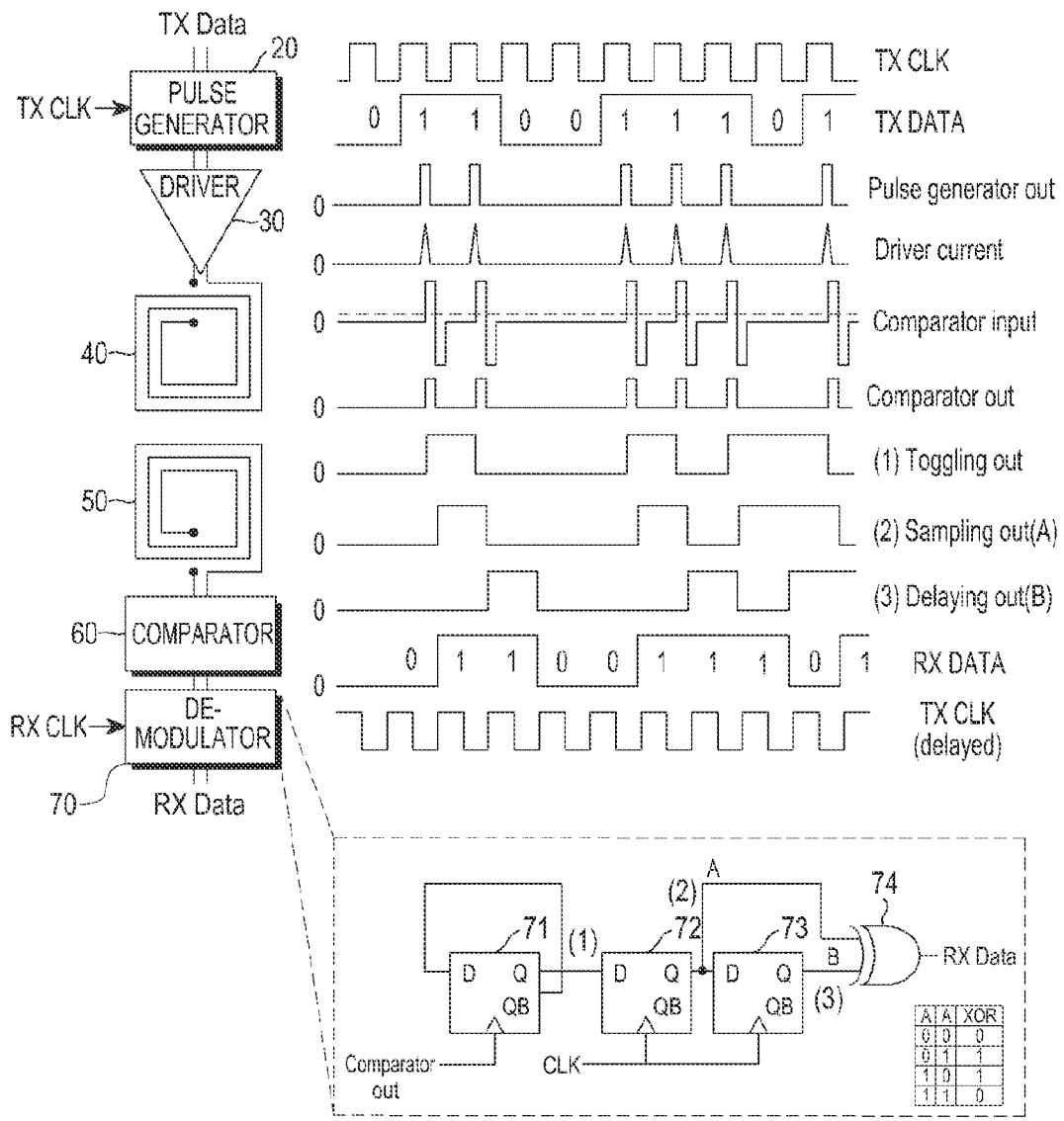
FIG. 14 is a flowchart illustrating a data transmission and recovery process according to an embodiment of the present invention.

A process of receiving and processing data by the near field wireless communication apparatus 100 is illustrated in FIG. 12. Referring to FIG. 12, as the data is received through the coupler in step 211, in other words, as current induced in the data reception coupler 50 by mutual inductance in step 211, the near field wireless communication apparatus 100 generates a positive/negative pulse signal corresponding to the received data in step 213. Then, in step 215, the near field wireless communication apparatus 100 recovers the positive pulse signal from positive/negative pulse signal, and in step 217, recovers the digital data from the positive pulse signal. An example of such a data transmission/reception process is illustrated in FIG. 14. In FIG. 14, it is assumed that the pulse generator 20, the driver 30, and the data transmission coupler 40 are included in the first apparatus, and the data reception coupler 50, the comparator 60 and the demodulator 70 are included in the second apparatus in which the first apparatus transmits data to the second apparatus.

Referring to FIG. 14, the controller of the first apparatus inputs transmission data (TX Data) with a "0110011101" value to the pulse generator 20 according to a transmission clock (TX CLK). According to transmission clock (TX CLK), the pulse generator 20 generates a positive pulse signal (Pulse generator out) only when the value of the transmission data (TX Data) is "1" and outputs the positive pulse signal to the driver 30. In response to the positive pulse signal, the driver 30 applies current (Driver current) to the data transmission coupler 40 only when it is not "0".

Thus, a positive/negative pulse signal (Comparator input) in which a positive pulse and a negative pulse intersect is generated in response to the time point where the current is induced in the data reception coupler 50 and input to the comparator 60.

The comparator 60 compares the reference signal and the positive/negative pulse signal (Comparator input). For a value smaller than the reference signal, the comparator 60 outputs "0" and for a value larger than the reference signal, the comparator 60 outputs a specific integer value. Thus, the comparator 60 recovers and outputs the positive pulse signal (Comparator out) to the demodulator 70.

The positive pulse signal (Comparator out) input to the demodulator 70 is input to the first delay flip-flop 71 which in turn outputs a corresponding toggling signal (Toggling out) to the second delay flip-flop 72. The second delay flip-flop 72 outputs a sampling signal obtained by sampling the toggling signal (Toggling out) according to the reception clock to the third delay flip-flop 73 and the exclusive OR gate 74. The third delay flip-flop 73 outputs a delaying signal (Delaying out) obtained by delaying the sampling signal (Sampling out) according to the reception clock to the exclusive OR gate 74. Thus, the exclusive OR gate 74 outputs reception data (RX DATA) having the "0110011101" value.

When data is transmitted/received according to the present invention, a very small amount of energy is consumed. Since the data is sent in a positive pulse form, energy is consumed only for a short moment. In addition, since the pulse is sent only when the data is "1" and the pulse is not sent when the data is "0," energy consumption may be further reduced. In addition, a sophisticated delay cell is not required. In the present invention, since timing may be conducted simply with a single delay flip-flop, implementation may be simple and power consumption is very small. In addition, errors are significantly reduced or eliminated. In a pulse base method, a pulse may be erroneously recovered due to a stochastic error. However, since the present invention employs a method in which two waveforms delayed in order to recover a pulse to data are compared and subject to an XOR operation, a data error occurs only for an erroneous pulse and the error does not have influence on other bits at all.

Figure 9:
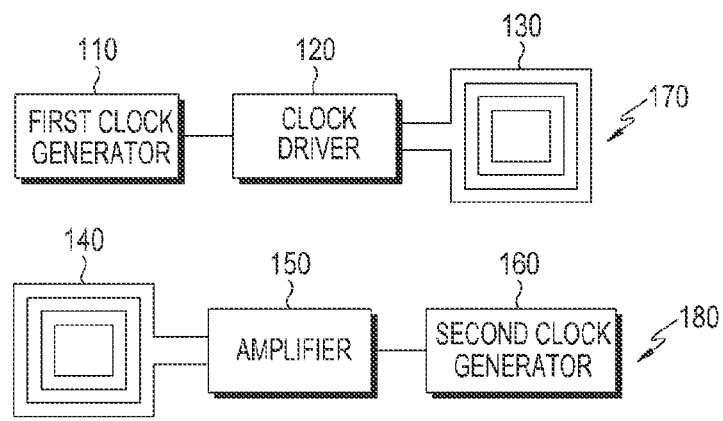
FIG. 9 illustrates a clock transceiver of a near field communication apparatus according to an embodiment of the present invention.

Meanwhile, as illustrated in FIG. 9, the near field wireless communication apparatus 100 of FIG. 7 may include a clock signal transmitter 170 and a clock signal receiver 180 in order to transmit/receive a clock signal. The clock signal transmitter 170 includes a first clock generator 110, a clock driver 120, and a clock transmission coupler 130, and the clock signal receiver 180 includes a clock reception coupler 140, an amplifier 150, and a second clock generator 160.

The first clock generator 110 generates and applies a transmission clock signal for data transmission to the data transmitter 80 and outputs the transmission clock signal to the clock driver 120 so as to transmit the clock signal to the reception side near field wireless communication apparatus. The clock driver 120 applies current to the clock transmission coupler 130 in response to the input clock signal so as to transmit the clock signal.

Whenever current is induced in the clock reception coupler 140 as the clock reception coupler 140 is inductive-coupled with the data transmission coupler of the transmission side near field wireless communication apparatus, in other words, whenever a clock signal is received, the clock reception coupler 140 outputs the received clock signal to the amplifier 150.

The amplifier 150 amplifies the received clock signal at a magnification to a degree required for recovering the signal loss during the transmission of the clock signal and then outputs the clock signal to the second clock generator 160.

The second clock generator 160 generates a reception clock to be used when demodulating received data, and according to the present invention, generates a reception clock signal harmonized to the clock signal input to the amplifier 150 and applies the reception clock signal to the data receiver 90.

Figure 10:
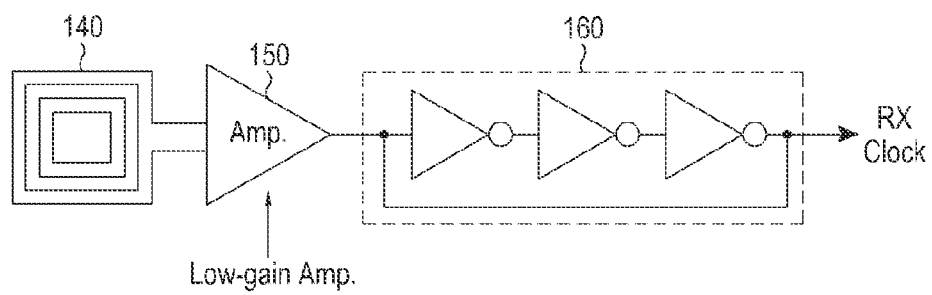
FIG. 10 illustrates a clock receiver according to an embodiment of the present invention.

FIG. 10 illustrates an example in which the second clock generator 160 is a ring oscillator. If the second clock generator 160 is a ring oscillator, a received clock signal may be recovered by injection-locking the output of the amplifier 150, i.e. the received clock signal, to the ring oscillator which oscillates at a free oscillation frequency. A voltage required in this case is significantly smaller than that required for demodulating a clock signal through signal processing and the power consumed in the ring oscillator is also very small. Thus, it may be referred to as a low power recovery method.

Figure 13:
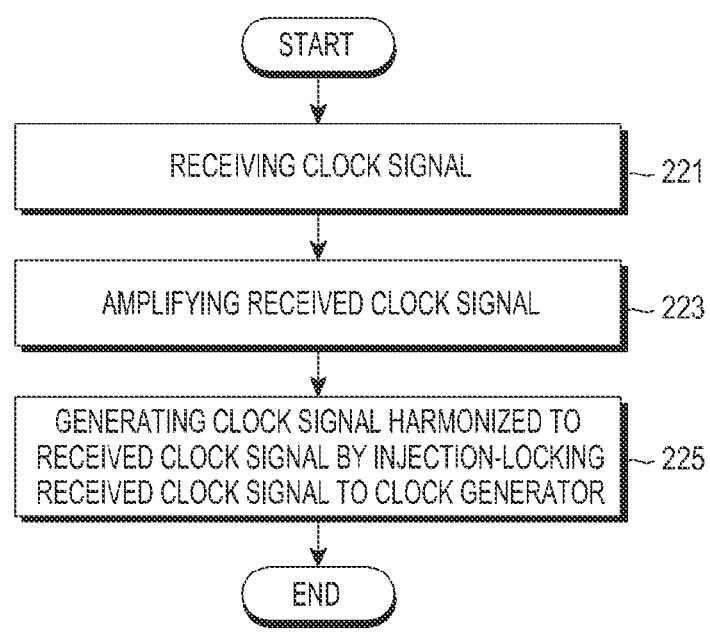

The process of receiving and processing a clock signal in this manner is illustrated in FIG. 13. Referring to FIG. 13, upon receiving a clock signal in step 221, the near field wireless communication apparatus 100 amplifies the received clock signal in step 223. Then, the near field wireless communication apparatus 100 injection-locks the clock signal to the clock generator so that a clock signal harmonized with the received clock signal may be generated.

The difference between the clock signal transmission/reception method according to the present invention and the injection-locking CDR method is as follows. Strictly speaking, the injection-locking CDR transmission/reception method is not a method of recovering a clock but a method of recovering only a sampling timing in view of the fact that as transitions of data increase, locking is conducted well and when the transitions are reduced, a section in which locking is not conducted is increased. Whereas, the clock signal transmission/reception method according to the present invention may also be used in a system clock since it purely recovers clock signals successively.

Although specific embodiments of the present invention have been described in detail herein, various modifications may be made without departing from the scope of the present invention. For example, the foregoing description assumes that the near field wireless communication apparatus 100 includes all of the data transmitter 80, the data receiver 90, the clock signal transmitter 170, and the clock signal receiver 180. However, according to an embodiment of the present invention, it is possible to configure a near field wireless communication apparatus that includes the data transmitter 80 and the data receiver 90 only, and it is also possible to configure a near field wireless communication apparatus that includes a clock signal transmitter 170 and clock signal receiver 180 only. In other words, it is possible to configure an apparatus that may transmit/receive digital data as described herein, but does not transmit/receive a clock signal. Alternatively, it is also possible to configure an apparatus that may process transmission/reception of digital data according to a method that is not described herein but uses the method of the present invention in transmission/reception of a clock signal. Accordingly, the scope of present invention shall be determined based on the claims and equivalents to the claims rather than based on the embodiments as described above.

What is claimed is:
1. A data communication method of a near field wireless communication apparatus using magnetic coupling, the method comprising:
generating, by a pulse generator, a first positive pulse signal corresponding to transmission digital data by outputting a positive pulse when the transmission digital data is "1" and not outputting a pulse when the transmission digital data is "0";
driving a data transmission coupler only for a period in which the first positive pulse signal is the positive pulse, thereby transmitting the transmission digital data;

generating a positive-to-negative pulse signal in which a positive pulse and a negative pulse intersect, in response to signal reception in a data reception coupler;

comparing a reference value with the positive-to-negative pulse signal to change the positive-to-negative pulse signal to a second positive pulse signal; and demodulating the second positive pulse signal to reception digital data, wherein demodulating the second positive pulse signal to the reception digital data comprises:

toggling, by a first delay flip-flop, the second positive pulse signal to generate a toggling signal, sampling, by a second delay flip-flop, the toggling signal to generate a sampling signal, delaying, by a third delay flip-flop, the sampling signal to generate a delay signal, and conducting an XOR operation for the sampling signal and the delay signal to output the reception digital data.

2. The method of claim 1, wherein changing the positive-to-negative pulse signal to the second positive pulse signal comprises, when a pulse value of the positive-to-negative pulse signal is larger than the reference value, a comparator outputs the positive pulse, and when the pulse value of the positive-to-negative pulse signal is smaller than the reference value, the comparator outputs "0", so that the second positive pulse signal is output.

3. The method of claim 1, further comprising:
transmitting a clock signal used when generating the transmission digital data through a clock transmission coupler.

4. The method of claim 1, further comprising:
amplifying a clock signal received through a clock reception coupler; and
generating a clock signal harmonized to the amplified clock signal to be used when demodulating reception data.

5. The method of claim 4, further comprising:
injection-locking the amplified clock signal to a ring oscillator to generate the clock signal harmonized to the amplified clock signal.

6. A near field wireless communication apparatus using magnetic coupling, the apparatus comprising:
a data transmission coupler;
a pulse generator configured to output a positive pulse when transmission digital data is "1" and to not output a pulse when the transmission digital data is "0," thereby generating a first positive pulse signal corresponding to the transmission digital data;
a driver configured to drive a data transmission coupler only for a period in which the first positive pulse signal is the positive pulse, thereby transmitting the transmission digital data;
a data reception coupler configured to output a positive-to-negative pulse signal generated in response to signal reception;
a comparator configured to compare the positive-to-negative pulse signal with a reference value and to change the positive-to-negative pulse signal to a second positive pulse signal, thereby outputting the second positive pulse signal; and
a demodulator configured to demodulate the second positive pulse signal to reception digital data,
wherein the positive-to-negative pulse signal is a signal in which a positive pulse and a negative pulse intersect, and
wherein the demodulator comprises:
a first delay flip-flop configured to toggle the second positive pulse signal to output a toggling signal,
a second delay flip-flop configured to sample the toggling signal to output a sampling signal,
a third delay flip-flop configured to delay the sampling signal to output a delay signal, and
an exclusive OR gate configured to conduct an XOR operation for the sampling signal and the delay signal to output the reception digital data.

7. The apparatus of claim 6, wherein, when a pulse value of the positive-to-negative pulse signal is larger than the reference value, the comparator outputs the positive pulse, and when the pulse value of the positive-to-negative pulse signal is smaller than the reference value, the comparator outputs "0," so that the second positive pulse signal is output.

8. The apparatus of claim 6, further comprising:
a clock transmitter configured to transmit a clock signal used when generating the transmission digital data through a clock transmission coupler.

9. The apparatus of claim 6, further comprising:
an amplifier configured to amplify a clock signal received through a clock reception coupler; and
a clock generator configured to generate and output a clock signal harmonized to the amplified clock signal to be used when demodulating reception data.

10. The apparatus of claim 9, wherein the clock generator is a ring oscillator and the amplified signal is injection-locked to the ring oscillator.

* * * * *